United States Patent
Johler et al.

(10) Patent No.: US 8,361,329 B2
(45) Date of Patent: Jan. 29, 2013

(54) OZONE TREATMENT OF ALKALI METAL COMPOUND SOLUTIONS

(75) Inventors: Paul Johler, Green River, WY (US); James Bronstein, Green River, WY (US)

(73) Assignee: OCI Wyoming L.P., Green River, WY (US)

( * ) Notice: Subject to any disclaimer, the term of this patent is extended or adjusted under 35 U.S.C. 154(b) by 369 days.

(21) Appl. No.: 12/658,395

(22) Filed: Feb. 5, 2010

(65) Prior Publication Data
US 2010/0196232 A1    Aug. 5, 2010

Related U.S. Application Data

(60) Provisional application No. 61/150,219, filed on Feb. 5, 2009.

(51) Int. Cl.
*C02F 1/78* (2006.01)

(52) U.S. Cl. ...... 210/760; 210/917; 423/184; 423/206.2

(58) Field of Classification Search .................. 210/760, 210/917; 423/184, 206.2
See application file for complete search history.

(56) References Cited

U.S. PATENT DOCUMENTS

| | | | |
|---|---|---|---|
| 3,616,900 A * | 11/1971 | Cecil et al. | 423/264 |
| 3,655,038 A | 4/1972 | Mercade | |
| 3,717,698 A | 2/1973 | Ilardi et al. | |
| 4,022,868 A | 5/1977 | Poncha | |
| 5,618,504 A | 4/1997 | Delling et al. | |
| 5,766,270 A | 6/1998 | Neuman et al. | |
| 5,783,159 A | 7/1998 | Aldinger | |
| 5,900,220 A | 5/1999 | Allen | |
| 5,911,959 A | 6/1999 | Wold et al. | |
| 5,955,043 A | 9/1999 | Neuman et al. | |
| 7,611,208 B2 | 11/2009 | Day et al. | |
| 2002/0054842 A1 | 5/2002 | Copenhafer et al. | |
| 2006/0110312 A1 | 5/2006 | Ziegenbalg et al. | |

FOREIGN PATENT DOCUMENTS
WO    WO 03/015025    2/2003

OTHER PUBLICATIONS

Ozone: Supporting Sustainability, International Ozone Association, Pam American Group, Aug. 24-27, 2008, Abstracts and Oral Presentations and Schedule of Events.
Storing and Handling soda ash, <http://www.ocichemical.com/soda_ash/sa_storage.asp?SubnavID=18>, (visited Dec. 9, 2008).
Sodium Percarbonate—All the cleaning power you'll ever need, <http://www.ocichemical.com/sodium_percarbonate/index.asp>, (visited Dec. 9, 2008).
Ozonation of Spent Reactive Dye-Baths: Effect of HCO3/CO\U2-3 Alkalinity, <http://cedb.asce.org/cgi/WWWdisplay.cgi?0203739>, (visited Dec. 6, 2008).

* cited by examiner

*Primary Examiner* — Lucas Stelling
(74) *Attorney, Agent, or Firm* — TraskBritt

(57) ABSTRACT

An aqueous solution containing an alkali metal compound solute and organic compound contaminants may be treated with ozone to oxidize and/or dissolve the organic contaminants. Treating the aqueous solution with ozone may decrease color contaminants in the alkali metal compound and may also decrease foaming in subsequent crystallization of the alkali metal compound.

20 Claims, 2 Drawing Sheets

OZONE TREATMENT OF ALKALI METAL COMPOUND SOLUTIONS

PRIORITY CLAIM

This application claims the benefit of the filing date of U.S. Provisional Patent Application Ser. No. 61/150,219, filed Feb. 5, 2009, now expired, for "OZONE TREATMENT OF ALKALI METAL COMPOUND SOLUTIONS," the entire disclosure of which is hereby incorporated herein by this reference.

BACKGROUND OF THE INVENTION

Recovery of substantially pure soda ash from a trona ore deposit typically involves either hard rock, underground mining or solution mining, with either recovery technique involving substantial aboveground processing to remove impurities, both inorganic and organic compounds, to yield a final crystalline product that is substantially white in color and with a purity in excess of 99% by weight sodium carbonate.

Trona is a naturally occurring ore that is a double salt $Na_2CO_3 \cdot NaHCO_3 \cdot 2H_2O$, also referred to as "sodium sequicarbonate." Inorganic impurities contained in shales associated with the trona deposit, such as sodium, calcium, and magnesium compounds, and silicates, etc., are often present in the ore in quantities of from about 9.0% to about 19.0% by weight and also contain about 1.5% to 2.0% free water. Also, carbonaceous impurities from the shale and in the trona ore itself totaling up to about 0.20% by weight are also typically present.

Both the organic and inorganic impurities are, desirably, either eliminated or substantially diminished during the aboveground processing and purification processing.

Large deposits of trona are located in southwestern Wyoming. Other deposits are located in Turkey, Africa, China and Mexico. About 90% of soda ash produced in the U.S. comes from the trona deposits in Wyoming. The trona deposits are often found in conjunction with shale oil deposits above or below the trona bed. This generally explains the carbonaceous impurities interlaced with the trona ore.

Typical aboveground processing is to crush the raw trona ore, which, after screening, is then calcined, at temperatures generally greater than 150° C. (302° F.), to convert a substantial quantity of sodium bicarbonate to sodium carbonate. The calcined product is then dissolved in a weak liquor. As used herein, the phrase "weak liquor" refers to an aqueous solution containing between 2.0% to 10.0% $Na_2CO_3$ by weight. The dissolved calcined product may then be clarified and filtered to remove insoluble shale solids and insoluble inorganics such as clays, dolomites, shortites and silicates. Carbonaceous impurities, some of which may be volatilized during the calcining step, remain, with a significant portion of these soluble in the aqueous medium. Treatment with activated carbon to absorb organic impurities is typically done so that the organic impurities may be removed by further filtration. These organic impurities, besides adversely affecting the color of the final soda ash product, cause moderate to severe foaming during subsequent evaporative crystallization processes that form mono-hydrate sodium carbonate crystals from the dissolved calcined product. Optional pretreatment of the dissolved calcined product with activated carbon and anti-foaming additives necessary to reduce foaming during the crystallization processes are expensive and sometimes not effective. Severe foaming may also cause expensive mechanical damage to the crystallizer, such as, for example, demister pads and mechanical vapor recompression equipment of the crystallizer. Severe foaming may also adversely affect triple-effect evaporative crystallizers causing sodium carbonate liquor carry over and contamination into the condensate system and cooling tower that leads to a loss of vacuum and boiling in the crystallizer bodies, which decreases production. Measures to control such foaming events, such as increasing the crystallizer liquor purge rate, also have a significant cost impact.

Regardless of the trona ore recovery technique (underground mining or solution mining) troublesome carbonaceous impurities are present that complicate and increase the expense of producing essentially pure, substantially white sodium carbonate.

BRIEF SUMMARY OF THE INVENTION

Introduction of ozone into a trona or sodium carbonate solution appears to decompose or oxidize carbonaceous (i.e., organic) impurities, causing the color of such solutions to become noticeably lighter in color. Further, the ozonation of such solutions results in significantly less foaming during subsequent crystallization steps, either substantially reducing or eliminating the need for liquor pretreatment with activated carbon and/or the addition of anti-foaming additives in the crystallization steps.

Naturally occurring ores of various alkali metal compounds frequently contain carbonaceous contaminants. Removal of such contaminants is very desirable in the production of a pure alkali metal product, such as sodium carbonate, sodium bicarbonate, sodium hydroxide, potassium carbonate, sodium chloride, potassium chloride and the like.

Substantial elimination of such carbonaceous (organic) contaminants is effectively accomplished by ozonation of aqueous solutions of such contaminated alkali metal compounds. Ozone is introduced as a gas, preferably in conjunction with oxygen, as a gas.

Although aqueous hydrogen peroxide has been utilized in conjunction with sodium persulfate as an actuator (see U.S. Pat. No. 3,717,698) to remove organic contaminants from a sodium carbonate solution, the hydrogen peroxide is hazardous to transport, store and pump. Furthermore, the hydrogen peroxide may introduce additional water, which may undesirably dilute the carbonate solution. This may further complicate subsequent processing by requiring an increase in size of processing equipment and energy required for removal of such additional water.

Ozone, in contrast, introduced as a gas, does not undesirably dilute the solutions of alkali metal compounds. Ozone is a very strong oxidizing agent. Ozone may be introduced solely or in conjunction with oxygen or other oxidizers. Oxygen is desirably introduced as an additive to dilute the ozone ($O_3$) in order to inject a larger quantity of the gas mixture to provide even distribution of the ozone through the aqueous alkali metal solution. Further, ozone is produced from oxygen using known techniques and, therefore, does not require any separation of the ozone product from the oxygen. Ozone gas is easy to inject into the liquor and because it can be generated in situ it avoids the hazards of transporting, storing and pumping of a strong relatively unstable oxidizer like hydrogen peroxide. Additionally, ozone is an exceptionally strong oxidizing agent and has a higher oxidation potential than hydrogen peroxide.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
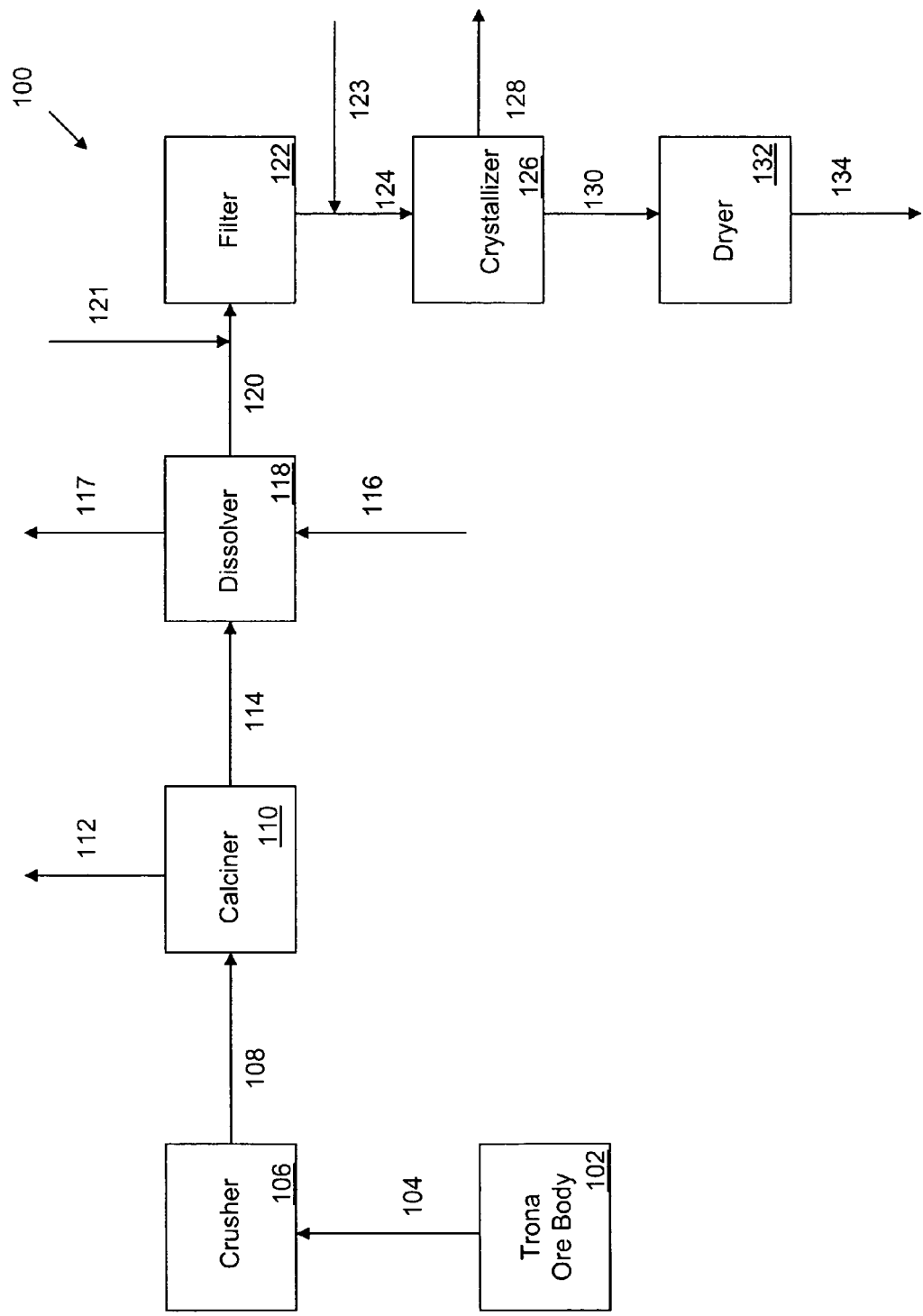
FIG. 1 is a schematic flow diagram depicting one embodiment of producing soda ash from trona according to the present invention.

According to embodiments of the invention, an aqueous solution containing an alkali metal compound solute and organic compound contaminants is treated with ozone. Introducing ozone into the aqueous solution alters carbonaceous color contaminants in the aqueous solution thereby substantially lightening the color of the aqueous solution by oxidizing and/or decomposing such carbonaceous contaminants. Furthermore, introducing ozone into the aqueous solution may also help to decrease or substantially eliminate foaming during subsequent crystallization of the aqueous solution as well as ultimately producing a pure, white crystalline soda ash product of high bulk density. The crystals formed from the ozone treated aqueous solution may also exhibit an improved crystal habit than when the aqueous solution is treated only with activated carbon. For example, the crystals formed from the ozone treated aqueous solution may be thick, boat-shaped crystals with a high bulk density in contrast to crystals formed from an aqueous solution not treated with ozone, which may be elongated, thin, needle-like crystals with a low bulk density.

Although trona is provided as one specific example of the present invention in the embodiments discussed hereinafter, it is understood that the invention may be used on any alkali metal compound contaminated with carbonaceous material. As used herein, the phrase "alkali metal compound" refers to an alkali metal compound from a naturally occurring ore body. For example, the alkali metal compound may comprise an alkali metal carbonate or bicarbonate. Additionally, the alkali metal compound may comprise other sodium and potassium compounds recovered from naturally occurring ore deposits. In still further embodiments, the alkali metal compound may be substantially free of crystalline sodium carbonate and/or crystalline sodium bicarbonate. Specific examples of other alkali metal compound-containing ores of the present invention include nacholite, dawsonite, wegsheiderite, thermonatrite, pirssonite, natron, gaylussite, shortite, halite, and other salts, minerals, and so forth in which carbonaceous materials are found.

The alkali metal compound-containing ore may be dissolved in water to form an aqueous solution containing an alkali metal compound solute. Because the alkali metal compounds originate from a naturally occurring ore body, organic contaminants are also frequently present in the aqueous solution in dissolved form or in such minute solid form that they stay suspended in the solution. The alkali metal compound may be dissolved after the alkali metal compound has been conventionally dry mined, or alternatively, the alkali metal compound may be dissolved underground using solution mining techniques. The solid alkali metal compound-containing ore may typically be processed in a manner such as crushing, screening, calcining or kilned with enough heat to chemically convert the alkali metal to another chemical form via a chemical reaction and also oxidizing or altering the chemical composition of the organics present in the ore.

Once the alkali metal compound is dissolved to form an aqueous solution, ozone is injected into the aqueous solution to decompose or oxidize organic contaminants present. In some embodiments, the ozone may be added in addition to oxygen or air, for example, a stream comprising about 6% to about 16% ozone with the balance being either oxygen or air may be injected into the aqueous solution. At least sufficient ozone is added to the aqueous solution to oxidize and/or decompose at least a minor quantity of these organic contaminants. In some embodiments, the ozone may be added to the aqueous solution in a sufficient amount to diminish substantially the coloration characteristics of the aqueous solution. For example, the ozone may be added to the aqueous solution until the solution is substantially clear, such as, a pale champagne color.

In additional embodiments, sodium peroxide or sodium percarbonate may also be added in addition to the ozone to enhance activation of the ozone and increase the ozone's oxidation potential.

In addition to improving the color of the aqueous solution, the ozone treatment substantially decreases foaming during subsequent crystallization of the alkaline metal compound from the aqueous solution. In conventional crystallization severe foaming may occur due to residual impurities, namely, organic impurities, still present in the aqueous solution. As such, pretreatment of the aqueous solution with activated carbon is required and anti-foaming additives may be added during the crystallization process. However, because the ozone treatment decreases this foaming, the use of activated carbon pretreatment and anti-foaming additives during crystallization may be significantly reduced or completely eliminated during the recovery of sodium carbonate from trona. Furthermore, as indicated hereinabove, a high quality crystalline soda ash is produced by the ozone treatment. The crystalline soda ash is a pure, white crystalline soda ash product of high bulk density.

The ozone may be introduced to the aqueous solution at various points during processing of the aqueous solution. For example, in one embodiment, ozone may be added to the aqueous solution before the crystallization of the alkaline metal compound such as either before or after the aqueous solution is filtered. In another embodiment, the ozone may be added to the aqueous solution during crystallization of the alkaline metal compound from the aqueous solution such as in a hydrocyclone and/or centrate recycle stream. In an additional embodiment, the alkaline metal compound may be crystallized from the aqueous solution in a crystallizer forming a crystal slurry stream and a purge stream, and the purge stream may then be treated with ozone. In some embodiments the ozone treated purge stream may be recycled back to the same or another crystallizer or to a dissolving tank process.

In one embodiment of the present invention ozone may be used to treat trona during its processing to form soda ash. As previously discussed, trona is a naturally occurring ore that is a double salt $Na_2CO_3.NaHCO_3.2H_2O$, also referred to as sodium sequicarbonate. FIG. 1 is a schematic flow diagram of a system 100 for converting solid trona into a white soda ash using ozone. The system 100 includes a crusher 106, a calciner 110, a dissolver 118, a filter 122, a crystallizer 126, and a dryer 132.

Raw trona ore 104 may be dry mined from an underground trona ore body 102 using conventional techniques which are known in the art. Aboveground, the raw trona ore 104 is fed to a crusher 106 where the trona 104 is crushed to a desirable particle size forming crushed trona ore 108. The crushed trona ore 108 may be screened to ensure the crushed trona ore 108 is the desirable size. For example the crushed trona ore 108 may have to pass through a 20- to a 150-mesh size screen.

The crushed trona ore 108 is fed to a calciner 110 to be calcined. In the calciner 110, the crushed trona 108 is converted to a dry product stream 114. Within the calciner 110, a substantial quantity of the sodium bicarbonate within the trona ore, in the presence of heat with typical temperatures ranging from about 150° C. to 300° C. in the calciner 110, is converted to sodium carbonate, carbon dioxide and water via the following reaction:

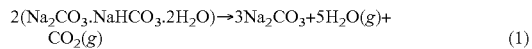

$$2(Na_2CO_3 \cdot NaHCO_3 \cdot 2H_2O) \rightarrow 3Na_2CO_3 + 5H_2O(g) + CO_2(g) \quad (1)$$

The carbon dioxide and water vapor are removed from the calciner 110 as a by-product gas stream 112. While some organic contaminants in the crushed trona ore 108 may be volatized in the calciner 110, a substantial quantity of organic contaminants may remain in the dry product stream 114. The dry product stream 114 may comprise essentially sodium carbonate, but at least trace amounts of unconverted sodium bicarbonate, inorganic contaminants and organic contaminants (Total Organic Carbons (TOCs)) are also typically present. For example, in one embodiment, the dry product stream 114 may comprise about 84 wt. % $Na_2CO_3$, about 0.50 wt. % $NaHCO_3$, about 16 wt. % inorganic contaminants, and about 0.20 wt. % organic contaminants. The calciner 110 may comprise, for example, a direct fired rotary furnace or an indirectly heated rotary furnace (not shown). The temperature of the calciner 110 is operated high enough to convert a majority of the $Na_2CO_3 \cdot NaHCO_3 \cdot 2H_2O$ to $Na_2CO_3$, such as, for example, a temperature greater than 150° C.; however, the temperature of the calciner 110 may be too low to volatilize a majority of the organic contaminants in the crushed trona 108. Operation of the calciner 110 at significantly higher temperatures, e.g., 300° C. or above, tends to reduce organic material content but undesirably increases the presence of soluble silicates, which are very difficult to remove. Thus, the temperature of the calcination may preferably be between about 150° C. and 200° C.

The dry calcined product stream 114 is then fed to the dissolver 118. A weak liquor 116 is added to the dissolver 118 to dissolve the dry product stream 114 thereby forming a nearly saturated or saturated aqueous solution 120 containing sodium carbonate, some sodium bicarbonate, inorganic, and organic compound contaminants. Coarse sized insoluble solids are separated from the aqueous solution 120 and removed from the dissolver 118 in waste stream 117. The aqueous solution 120, which may contain fine solids, is fed to the filter 122 where the fine solids may be filtered from the aqueous solution 120 forming a filtered aqueous stream 124. In some embodiments, the aqueous solution 120 may also be fed to a clarifier before the filter 122 to allow the fine solids to settle from the aqueous solution 120.

In one embodiment, ozone 121 is fed to the aqueous solution 120 before being fed to the filter 122. As previously discussed, the ozone 121 may be pure ozone or it may be in combination with oxygen or air. Alternatively, in another embodiment, ozone 123 may be fed to the filtered aqueous stream 124 after the filter 122. In further embodiments, ozone 121, 123 may be fed to the aqueous solution 120 both before and after the filter 122. The ozone 121, 123 is added to oxidize and/or to decompose the organic contaminants that were in the dry product stream 114. The ozone 121, 123 is preferably fed in an amount high enough to oxidize and/or decompose at least a minor quantity of the organic contaminants (Total Organic Carbons). For example, the ozone 121, 123 may be fed in an amount to substantially diminish the coloration characteristics caused by the organic contaminants. In some embodiments, the amount of ozone 121, 123 fed to the dissolver 118 may be at least 50% of the stoichiometric ratio of ozone to organic contaminants. In further embodiments, the amount of ozone 121, 123 fed before or after the filter 122 may be about 500% of the stoichiometric ratio of ozone to organic contaminants to reduce the color-causing characteristics of such organic contaminates to a negligible amount.

The ozonated sodium carbonate aqueous solution 124 may be fed to a crystallizer 126. Within the crystallizer 126, the sodium carbonate is crystallized to form a sodium carbonate mono-hydrate crystal slurry 130. A purge stream 128 comprising $Na_2CO_3$, $NaHCO_3$, organic and inorganic impurities is typically removed from the crystallizer 126. Because the sodium carbonate aqueous solution 124 fed to the crystallizer 126 has been treated with ozone, a substantially small amount, if any, of activated carbon may be added to the sodium carbonate aqueous solution 124 and/or anti-foaming agent added to the crystallizer 126.

Excess water may be removed from the sodium carbonate mono-hydrate crystal slurry 130 with, for example, hydrocyclones and centrifuges to produce a moist cake that is then fed to a dryer 132 to produce a soda ash product stream 134. The product stream 134 may be at least substantially white in color.

Figure 2:
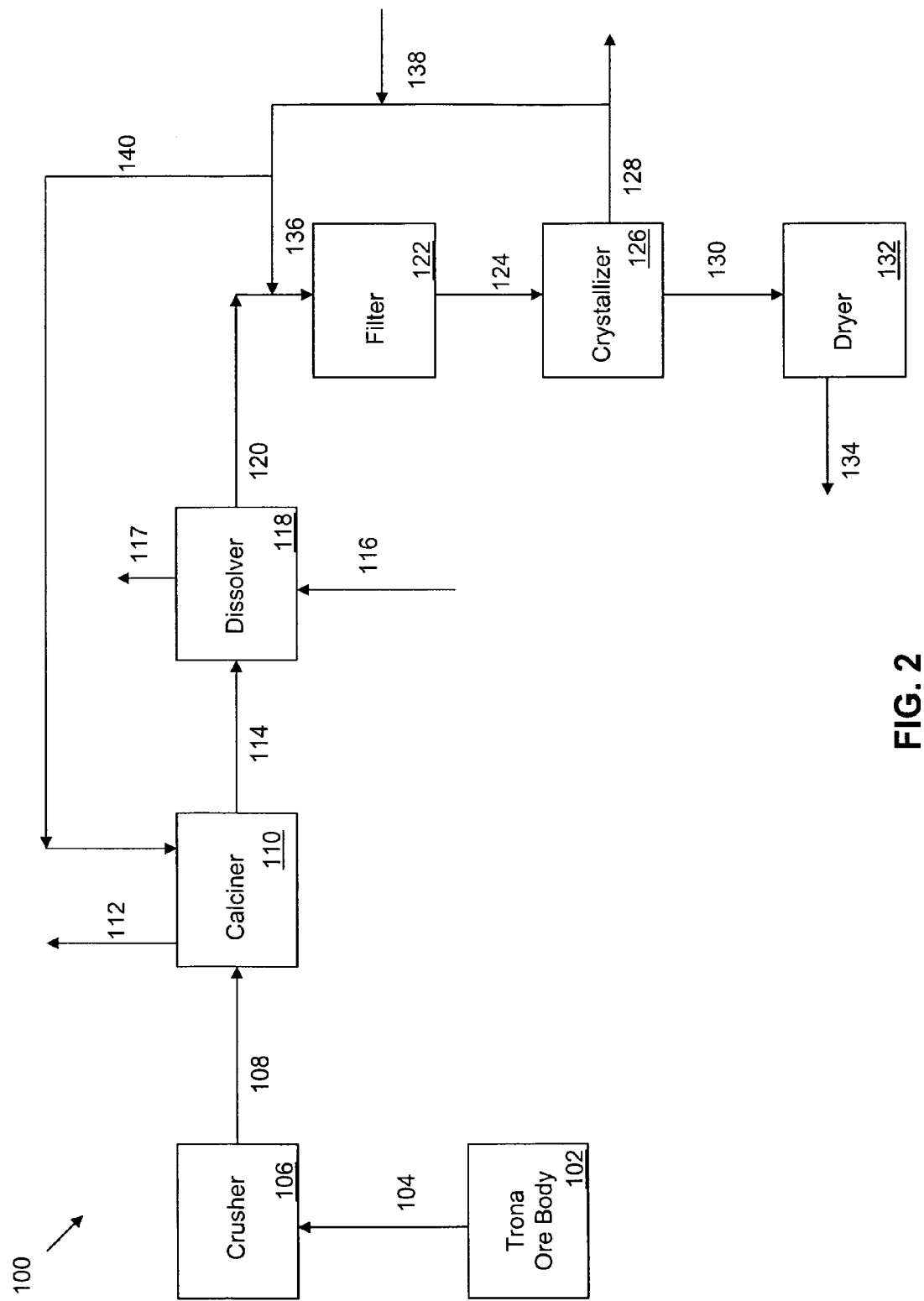
FIG. 2 is a schematic flow diagram depicting another embodiment of producing soda ash from trona according to the present invention.

FIG. 2 is a schematic diagram of another embodiment of a system 100 of the present invention. As shown in FIG. 2, at least a portion of the purge stream 128 from the crystallizer 126 is recycled back to the aqueous solution 120 before being fed to the filter 122 via recycle stream 136 or the purge stream 128 may be recycled back to the calciner 110 via recycle stream 140. Ozone 138 may be added to the purge stream 128 before the purge stream 128 is recycled to the calciner 110 or the aqueous solution 120. In some embodiments, a portion of the purge stream 128, after treatment with the ozone 138, may be fed to an additional, separate calciner (not shown). Treating the purge stream 128 with ozone 138 helps to reduce waste and increase the efficiency of the crystallization process in the system 100. The treatment of the purge stream 128 may be the only ozone treatment site or ozone may also be added at other process sites including the calciner 110 or dissolver 118.

In an alternative embodiment, the trona may be solution mined using techniques as known in the art. For example, solution mining can be accomplished by injecting water or other aqueous based solution via a drilled hole into a deposit of trona ore, allowing the solution to dissolve as much of the soluble ore as possible, pumping the solution via a drilled well hole to the surface and processing the solution to recover the dissolved ore values from the solution. Because the trona ore is already dissolved when it reaches the surface, the ozone may be added directly to the dissolved trona ore. Typically, solution mined solutions are less concentrated in total alkali metal content and may be concentrated before being introduced into a crystallizer. Ozonation may occur anywhere from the wellhead to, and including, the crystallizer. Also, solution mined solutions are typically processed to obtain concentrated solutions of $Na_2CO_3$ with only minor quantities of $NaHCO_3$ present. In this regard, see, for example, U.S. Pat. No. 5,955,043 to Neuman et al., titled Production of Sodium Carbonate from Solution Mine Brine, and U.S. Pat. No. 5,766,270 to Neuman et al., titled Solution Mining of Carbonate/Bicarbonate Deposits to Produce Soda Ash. In other embodiments, the ozone may be added in subsequent processing steps, such as, for example, during wet calcining (sodium bicarbonate stripping) or crystallization.

The ozone used in the systems 100 illustrated in FIGS. 1 and 2 may be obtained by any process known to those of ordinary skill in the art. For example, the ozone can be produced from an ozone generator using electrical power and a feed stream of either oxygen or air. Oxygen feed is preferred because it increases the ozone generator's efficiency and reduces the size of the equipment needed. The oxygen feed can come from liquefied oxygen or an oxygen generator such as a vacuum or pressure swing adsorption unit. Output from the ozone generator with oxygen feed will typically be composed of 6% to 16% by weight ozone with 94% to 84% oxygen (with smaller amounts of other gases associated with air). The oxygen in the gas steam also acts as an organic oxidizer but to a much lesser extent than the ozone. The oxidation effectiveness of the ozone may be enhanced by other oxygen-based compounds such as hydrogen peroxides ($H_2O_2$) and/or sodium percarbonate. Given that ozone is relatively expensive to produce, other oxidizing agents may be usefully included with the ozone. A commercially available ozone generator may be obtained from the Mazzei Co. website, which may be found on the World Wide Web at mazzei.net.

Other methods for producing ozone may include using corona discharge methods, electrochemical methods, and methods involving ultraviolet radiation. In the corona discharge method, oxygen or an oxygen-containing gas, most commonly air, is passed through a space between two electrodes separated by a dielectric material, which is usually glass. The electrodes are most often either concentric metallic tubes or flat, plate-like electrodes that are connected to a source of high voltage. When a voltage is supplied to the electrodes, a corona discharge forms between the two electrodes, and the oxygen in the discharge gap is converted to ozone. A corona discharge is a physical phenomenon characterized by a low-current electrical discharge across a gas-containing gap at a voltage gradient, which exceeds a certain critical value. First, oxygen molecules, $O_2$, are split into oxygen atoms, O, and then the individual oxygen atoms combine with remaining oxygen molecules to form ozone, $O_3$.

The corona discharge generates heat that causes the produced ozone to decompose into oxygen atoms and molecules. In order to prevent this decomposition, ozone generators which utilize the corona discharge method must be equipped with a means of cooling the electrodes. The temperature of the gas inside the discharge chamber must be maintained at a temperature between the temperature necessary for formation of ozone to occur and the temperature at which spontaneous decomposition of ozone occurs. This necessary cooling is usually accomplished by circulating a coolant such as water or air over one surface of the electrodes so that the heat given off by the discharge is absorbed by the coolant. The corona discharge method of producing ozone is typically preferred because it produces the highest concentrations of ozone per unit of electrical energy used.

Alternatively, in the electrochemical method of ozone production, an electrical current is applied between an anode and cathode in an electrolytic solution containing water and a solution of highly electronegative anions. A mixture of oxygen and ozone is produced at the anode. Another common method of ozone generation involves bombarding oxygen with ultraviolet radiation which splits oxygen molecules into oxygen atoms which combine with other oxygen molecules to form ozone.

SPECIFIC EXAMPLES

Example 1

A saturated 30% sodium carbonate ($Na_2CO_3$) liquor with about 70 to about 100 parts per million (ppm) of Total Organic Carbon (TOC) having a dark amber color was treated with ozone alone. The ozone was added to the liquor as a gas stream with approximately 10 wt. % ozone and 90 wt. % oxygen at a rate of between about 125 to about 160 standard cubic feet per hour (scfh). The ozone gas was added to the liquor until the liquor contained an effective ozone concentration of approximately 0.034 wt. %. The TOC concentration in the resulting ozone treated liquor was reduced by 8.46% ppm. Using a spectrophotometer at 300 nm, the color of the ozone treated liquor was reduced about 43.5% when compared to a standard untreated dark amber-colored liquor. Furthermore, the ozone treated liquor exhibited no foaming in subsequent processing.

Example 2

The same treatment as described in Example 1, except ozone gas was added to the liquor until the liquor contained an effective ozone concentration of approximately 0.103 wt. %. The TOC in the resulting ozone treated liquor was reduced 19.04% ppm. Using a spectrophotometer at 300 nm, the color of the ozone treated liquor was reduced by about 47.8% when compared to a standard untreated dark amber-colored liquor. Furthermore, the ozone treated liquor exhibited no foaming in subsequent processing.

Example 3

A supersaturated crystallizer purge stream containing about 30% sodium carbonate ($Na_2CO_3$) liquor and about 5% to about 10% mono-hydrate ($Na_2CO_3.H_2O$) crystals, which had a dark brown color, was treated with ozone. The ozone was added to the liquor as a gas stream with approximately 10 wt. % ozone and 90 wt. % oxygen at a rate of between about 125 to about 160 standard cubic feet per hour (scfh). The ozone gas was added to the liquor until the liquor contained an effective ozone concentration of approximately 0.059 wt. %. The ozone treated liquor was then treated with 1000 ppm wood-based powdered activated carbon (PAC) and shaken for 5 minutes. The ozone treated liquor was then filtered through a Whatman #1 filter. The TOC in the resulting treated liquor was reduced by about 38.98% ppm. The treated liquor had a water-white color and using a spectrophotometer at 300 nm, the color of the treated liquor was reduced about 76.72% when compared to a standard untreated dark brown-colored liquor. Furthermore, the ozone treated liquor exhibited no foaming in subsequent processing.

Example 4

A supersaturated crystallizer purge stream containing about 30% sodium carbonate ($Na_2CO_3$) liquor and about 5% to about 10% mono-hydrate ($Na_2CO_3.H_2O$) crystals with a dark brown color was treated with ozone. The ozone was added to the liquor as a gas stream with approximately 10 wt. % ozone and 90 wt. % oxygen at a rate of between about 125 to about 160 standard cubic feet per hour (scfh). The ozone gas was added to the liquor until the liquor contained an effective ozone concentration of about 0.046 wt. % to about 0.135 wt. %. The ozone treated liquor was then treated with 1000 ppm coal-based powdered activated carbon (PAC) and shaken for 5 minutes. The ozone treated liquor was then filtered through a Whatman #1 filter. The TOC in the resulting treated liquor was reduced by about 34.36% ppm. The treated liquor had a water-white color and using a spectrophotometer at 300 nm, the color of the treated liquor was reduced about 79.05% when compared to a standard untreated dark brown-colored liquor. Furthermore, the ozone treated liquor exhibited no foaming in subsequent processing.

Example 5

A saturated crystallizer feed stream containing about 30% sodium carbonate ($Na_2CO_3$) liquor with about 70 to about 100 parts per million (ppm) of carbon having a dark amber color was treated with 200 ppm wood-based powdered activated carbon (PAC) through a pressure leaf filter. The filtered liquor was then treated with ozone. The ozone was added to the filtered liquor as a gas stream with approximately 10 wt. % ozone and 90 wt. % oxygen at a rate of between about 125 to about 160 standard cubic feet per hour (scfh). The ozone gas was added to the liquor until the liquor contained an effective ozone concentration of about 0.046 wt. % to about 0.130 wt. %. The TOC in the resulting treated liquor was reduced by about 49.26% ppm. The treated liquor had a water-white color and using a spectrophotometer at 300 nm, the color of the treated liquor was reduced about 77.23% when compared to a standard untreated dark amber-colored liquor. Furthermore, the ozone treated liquor exhibited no foaming in subsequent processing.

Example 6

A supersaturated crystallizer purge containing about 30% sodium carbonate ($Na_2CO_3$) liquor and about 5% to about 10% mono-hydrate ($Na_2CO_3 \cdot H_2O$) crystals having a dark brown color was treated with 200 ppm wood-based powdered activated carbon (PAC) and filtered through a pressure leaf filter. The filtered liquor was then treated with ozone. The ozone was added to the filtered liquor as a gas stream with approximately 10 wt. % ozone and 90 wt. % oxygen at a rate of between about 125 to about 160 standard cubic feet per hour (scfh). The ozone gas was added to the liquor until the liquor contained an effective ozone concentration of about 0.052 wt. % to about 0.180 wt. %. The TOC in the resulting treated liquor was reduced by about 41.63% ppm. The treated liquor had a water-white color, and using a spectrophotometer at 300 nm, the color of the treated liquor was reduced about 71.21% when compared to a standard untreated dark amber-colored liquor. Furthermore, the ozone treated liquor exhibited no foaming in subsequent processing.

A treatment of any of the above solutions with activated carbon alone resulted in only a small decrease in foaming characteristics, TOC, and color.

The preceding specific embodiments are illustrative of the practice of the invention. The present invention may be embodied in other specific forms without departing from the spirit or essential attributes thereof and, accordingly, reference is made to the appended claims, rather than the foregoing specification, as indicating the scope of the invention.

What is claimed is:

1. A method of treating an aqueous alkali metal compound solution, comprising:
    forming an aqueous solution comprising an alkali metal compound derived from a natural ore source, and organic compound contaminants;
    crystallizing the alkali metal compound from the aqueous solution; and
    introducing ozone gas into the aqueous solution when crystallizing the alkali metal compound solute therefrom to reduce total organic carbon (TOC) and color in the aqueous solution.

2. The method of claim 1, wherein the alkali metal compound is a carbonate or bicarbonate of an alkali metal.

3. The method of claim 2, wherein the alkali metal is sodium.

4. The method of claim 3, wherein introducing ozone gas into the aqueous solution comprises supplying a sufficient amount of the ozone gas to reduce foaming of the aqueous solution.

5. The method of claim 1, wherein introducing ozone gas into the aqueous solution comprises introducing the ozone gas into the aqueous solution in conjunction with oxygen gas or ambient air.

6. The method of claim 5, wherein introducing the ozone gas into the aqueous solution in conjunction with the oxygen gas or the ambient air comprises introducing oxygen and ozone at weight ratio within a range of from about 15.7:1 to about 5.25:1.

7. A method of treating an aqueous alkali metal compound solution, comprising:
    forming an aqueous solution comprising an alkali metal compound derived from a natural ore source, and organic compound contaminants;
    crystallizing the alkali metal compound from the aqueous solution in a crystallizer to form a crystal slurry stream and a purge steam;
    treating the purge stream with ozone; and
    recycling the ozone treated purge stream to the step of crystallizing the alkali metal compound.

8. The method of claim 7, wherein treating the purge stream with ozone comprises:
    filtering at least a portion of the purge stream; and
    treating the filtered at least a portion of the purge stream with the ozone.

9. The method of claim 7, wherein recycling the ozone treated purge stream to the step of crystallizing the alkali metal compound comprises sending the ozone treated purge stream into the crystallizer.

10. The method of claim 7, wherein recycling the ozone treated purge stream to the step of crystallizing the alkali metal compound comprises sending the ozone treated purge stream into the aqueous solution before the aqueous solution enters the crystallizer.

11. The method of claim 10, wherein sending the ozone treated purge stream into the aqueous solution before the aqueous solution enters the crystallizer comprises sending the ozone treated purge stream into the aqueous solution before the aqueous solution enters a filtration system upstream of the crystallizer.

12. A process of forming an alkali metal compound product, comprising:
    introducing ozone into an alkali metal compound solution comprising an alkali metal compound and soluble organic colorant contaminants to reduce each of color, total organic carbon, and foaming in the alkali metal compound solution;
    crystallizing the alkali metal compound from the alkali metal compound solution in a crystallizer to form a crystal slurry stream and a purge stream;
    forming an alkali metal compound product from the crystal slurry stream, the alkali metal compound product exhibiting high bulk density and a white color; and
    treating the purge stream with additional ozone.

13. The process of claim 12, wherein the alkali metal compound comprises at least one of sodium carbonate and sodium bicarbonate.

14. The process of claim 12, further comprising dissolving alkali metal compounds derived from a naturally occurring ore body in water to form the alkali metal compound solution.

15. The process of claim 12, wherein introducing ozone into an alkali metal compound solution comprises introducing the ozone into the alkali metal compound solution in conjunction with oxygen gas.

16. The process of claim 15, wherein introducing the ozone into the alkali metal compound solution in conjunction with oxygen gas comprises introducing the oxygen gas and the ozone at a weight ratio within a range of from about 15.7:1.0 to about 5.25:1.0.

17. The process of claim 12, wherein introducing ozone into an alkali metal compound solution comprises introducing the ozone at a stoichiometric ratio of about 50% to about 500% of the soluble organic colorant contaminants.

18. The process of claim 12, wherein introducing ozone into an alkali metal compound solution comprises introducing the ozone into the alkali metal compound solution before crystallizing the alkali metal compound from the alkali metal compound solution.

19. The method of claim 12, further comprising recycling the purge stream treated with ozone to the crystallizer, another crystallizer, or a crystallizer feed tank.

20. The method of claim 12, wherein introducing ozone into an alkali metal compound solution comprises introducing the ozone into the alkali metal compound solution while crystallizing the alkali metal compound from the alkali metal compound solution.

* * * * *